United States Patent
Persson et al.

(10) Patent No.: US 10,237,802 B2
(45) Date of Patent: Mar. 19, 2019

(54) QOS CONFIGURATION FOR A WIRELESS DEVICE

(71) Applicant: TELEFONAKTIEBOLAGET L M ERICSSON (PUBL), Stockholm (SE)

(72) Inventors: Fredrik Persson, Märsta (SE); Per Willars, Vaxholm (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 81 days.

(21) Appl. No.: 14/794,143

(22) Filed: Jul. 8, 2015

(65) Prior Publication Data
US 2017/0013529 A1 Jan. 12, 2017

(51) Int. Cl.
| | | |
|---|---|---|
| H04W 36/30 | (2009.01) | |
| H04W 36/00 | (2009.01) | |
| H04W 36/08 | (2009.01) | |
| H04W 72/08 | (2009.01) | |

(52) U.S. Cl.
CPC .......... *H04W 36/30* (2013.01); *H04W 36/00* (2013.01); *H04W 36/08* (2013.01); *H04W 72/087* (2013.01)

(58) Field of Classification Search
CPC .... H04W 36/30; H04W 36/08; H04W 72/087
See application file for complete search history.

(56) References Cited

U.S. PATENT DOCUMENTS

| | | | | |
|---|---|---|---|---|
| 2004/0198365 A1* | 10/2004 | Verma | ............... | H04W 36/0011 455/452.1 |
| 2011/0044198 A1* | 2/2011 | Persson | ................ | H04W 28/24 370/252 |
| 2011/0310737 A1 | 12/2011 | Klingenbrunn et al. | | |
| 2011/0310850 A1* | 12/2011 | Klingenbrunn | ....... | H04W 36/30 370/332 |
| 2012/0051327 A1* | 3/2012 | Persson | ............. | H04W 36/0055 370/331 |

(Continued)

FOREIGN PATENT DOCUMENTS

| | | |
|---|---|---|
| WO | 2008008990 A2 | 1/2008 |
| WO | 2012107907 A1 | 8/2012 |

OTHER PUBLICATIONS

Title: Enhancements to QoS Management for real time radio bearers in 3G cellular systems Naim et al. Sep. 2000 IEEE.*

(Continued)

*Primary Examiner* — Rina C Pancholi

(57) ABSTRACT

A method for configuring a QoS for a wireless communication network bearer corresponding to a wireless device is provided. The method includes assigning a first QoS profile to the bearer when the wireless device is in a first QoS region served by a first wireless communication network cell, the first QoS profile corresponding to a first QoS available in the first wireless communication network cell but not available to the wireless device in a second wireless communication network cell neighboring the first wireless communication network cell. The method further includes establishing communication for the bearer between the wireless device and the second wireless communication network cell when the wireless device begins a handover process with the second wireless communication network cell, the communication for the bearer being established using the first QoS profile but corresponding to a second QoS level different from the first QoS level.

22 Claims, 7 Drawing Sheets

(56) References Cited

U.S. PATENT DOCUMENTS

2013/0083771 A1* 4/2013 Zhao .................... H04W 36/14
370/331

OTHER PUBLICATIONS

Naim, et al., Enhancements to QoS Management for Real Time Radio Bearers in 3G Cellular Systems.

3GPP TS 23.401 V10.7.0, section 5.4.2.1; 3rd Generation Partnership Project; Technical Specification Group Services and System Aspects; General Packet Radio Service (GPRS) enhancements for Evolved Universal Terrestrial Radio Access Network (E-UTRAN) access (Release 10); Mar. 2012.

3GPP TS 36.300 V12.5.0, section 10.1.2.1.1; 3rd Generation Partnership Project; Technical Specification Group Radio Access Network; Evolved Universal Terrestrial Radio Access (E-UTRA) and Evolved Univeral Terrestrial Radio Access Network (E-UTRAN); Overall description; Stage 2 (Release 12); Mar. 2015.

* cited by examiner

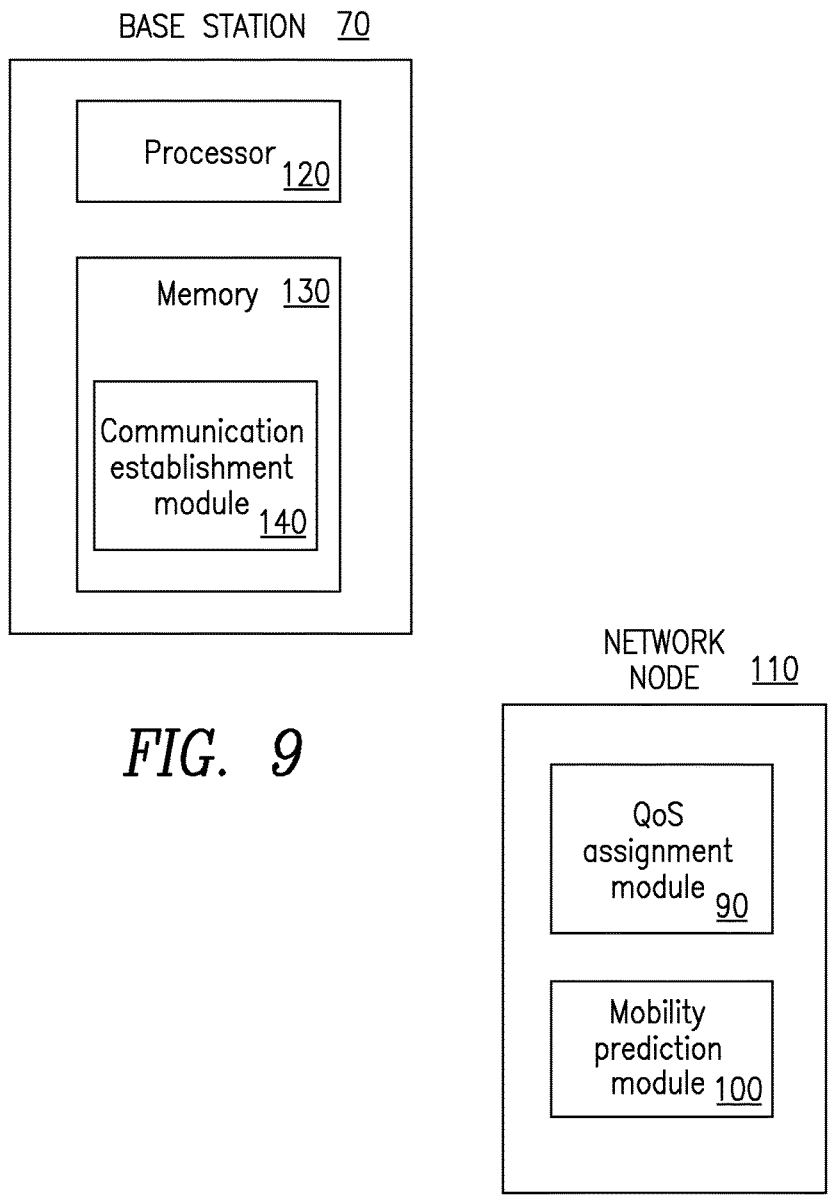

QOS CONFIGURATION FOR A WIRELESS DEVICE

TECHNICAL FIELD

The present disclosure relates to a method, node and base station for a wireless communication system, and in particular to configuring a quality of service for wireless communication network bearers in the wireless communication system.

BACKGROUND

In wireless communication networks, such as, for example, a Long Term Evolution (LTE) $3^{rd}$ Generation Partnership Project (3GPP) network, the quality of service (QoS) provided to each bearer in the network is typically managed on a per bearer level from the core network. The Radio Access Network (RAN) is usually responsible for setting up radio bearers, radio resource management and enforcing a QoS level according the bearer's QoS profile. During the triggering of handover events, such as, for example, when a wireless device user moves from an outdoor/macro system to an indoor/enterprise system, the QoS profile for each bearer may need to be updated to reflect the user's new region. This results in bearer modification, which can lead to such problems as service interruption.

For example, a wireless device user is using data traffic on a bearer having a QoS Class Identifier (QCI)=x while connected to an outdoor, or macro, system. The user moves indoors to connect to their indoor, or enterprise, system and a handover will occur, assigning the same QoS profile (QCI=x) to the bearer as used for the macro system. A location event is reported to a policy and charging rules function (PCRF) entity, which, if a higher QoS level on the indoor system is desired, triggers a bearer modification to a higher QoS profile i.e., QCI=y. This implies a QoS upgrade on the indoor RAN.

When the user leaves the indoor system, another handover procedure will request the same QoS profile that was assigned to the bearer while the wireless device user was connected to the indoor system. However, if the target macro base station is not configured to support an enhanced QoS profile, i.e., QCI=y for that particular bearer, either a different QCI is selected by the target e-Node-B (eNB), or the handover will be rejected and the bearer torn down. In some cases, a default QCI may be applied, which could be associated with the lowest available QoS level, which can lead to inadequate user service. Further, when a location event is reported back to the PCRF entity, a bearer modification may trigger an update back to the macro QoS profile, i.e., QCI=x, which was the original QCI used on the macro system. During the bearer modification process, data traffic will be interrupted. A "ping pong" effect can also take place where bearers are bounced back and forth between the indoor and outdoor systems, further interrupting traffic.

There is shown in FIG. 1 a block diagram of a known LTE QoS $4^{th}$ Generation (4G) network. In a wireless communication system such as the one shown in FIG. 1, services are provided to a subscriber on radio bearers. Bearers are the logical connection that carry audio, video, data, and/or control signaling between a network node, such as a mobile management entity (MME), and a base station or between a base station and a wireless device, e.g., user equipment (UE), of a subscriber. Bearers, including a QoS profile for each bearer, are set up from the PDN GW in the core network (CN) and the QoS is enforced in the PDN GW and in the eNB for the downlink and in the wireless device, i.e., UE, and the base station, i.e., eNB, for the uplink. The bearer can be either a dedicated bearer, which carries specific data flows to/from a wireless device, or a default bearer, which handles all traffic not specified for a dedicated bearer to the wireless device. The present disclosure applies to location-based QoS differentiation of traffic on both default and dedicated bearers.

As used herein, the term "QoS profile" refers to a set of values including, e.g., a QCI value, that are assigned to a bearer to indicate a corresponding QoS level to be realized or enforced for the bearer. Moreover, as used herein, the term "QoS level" refers to a result, e.g., a high QoS or a low QoS, that is realized. The QoS level is typically realized using a set of corresponding QoS parameters, e.g., a minimum throughput rate parameter, an error rate parameter, a scheduler priority etc., stored at and enforced, e.g., by the base station. The correspondence between different QoS profiles and their corresponding QoS levels and corresponding sets of QoS parameters may be configured by an operator of the RAN.

In FIG. 2, a bearer modification procedure for an LTE system according to the prior art, is shown. In the illustrated procedure, after an exchange of measurement control signals and measurement reports between a UE and a source eNB, a handover decision is made (step 3) and the source eNB sends a handover request to the target eNB. Included in the handover request is the bearer QoS profile applied in the source eNB. The target eNB then makes an admission assessment (step 5) and if granted, sends a handover request acknowledgment back to the source eNB in step 6. A bearer modification is triggered every time the QoS profile needs to be updated. As discussed above, bearer modifications can lead to service interruptions.

SUMMARY

The present disclosure advantageously provides a method, node, and base station for configuring a quality of service for wireless communication network bearers in a wireless communication system. According to one broad aspect of the disclosure, a method for configuring a QoS level for a wireless communication network bearer corresponding to a wireless device is provided. The method includes assigning a first QoS profile to the bearer when the wireless device is in a first QoS region served by a first wireless communication network cell, where the first QoS profile corresponds to a first QoS level available in the first wireless communication network cell but not available to the wireless device in a second wireless communication network cell neighboring the first wireless communication network cell. The method also includes establishing communication for the bearer between the wireless device and the second wireless communication network cell when the wireless device begins a handover process with the second wireless communication network cell. The communication for the bearer is established using the first QoS profile but corresponding to a second QoS level different from the first QoS level.

According to one embodiment of this aspect, the method further includes determining, after the handover process with the second wireless communication network cell, whether the wireless device is likely to return to the first QoS region served by the first wireless communication network cell. When it is determined that the user of the wireless device is not likely to return to the first QoS region, a second QoS profile is assigned to the bearer. When it is determined that the wireless device is likely to return to the first QoS region, the first QoS profile is maintained. According to another embodiment of this aspect, the first wireless communication network cell is an indoor cell and the second wireless communication network cell is an outdoor cell.

According to another embodiment of this aspect, determining whether the wireless device is likely to return the first QoS region includes starting a timer, and determining that a handover of the wireless device back to the first wireless communication network cell or another wireless communication network cell that serves the first QoS region, has not occurred when the timer expires.

According to another embodiment of this aspect, determining whether the wireless device is likely to return the first QoS region includes identifying movement of the wireless device in a direction away from the first QoS region.

According to another embodiment of this aspect, determining whether the wireless device is likely to return the first QoS region includes determining that the wireless device is within a predetermined geographic area within a second QoS region.

According to another embodiment of this aspect, the determination of whether the wireless device is likely to return the first QoS region is made by at least one of a Mobility Management Entity (MME), a policy and charging rules function (PCRF), and a packet data network gateway (PDN GW).

According to another embodiment of this aspect, the first QoS level corresponding to the first QoS profile is implemented in the first wireless communication network cell using a first set of QoS parameters and the second QoS level different from the first QoS level is implemented in the second wireless communication network cell using a second set of QoS parameters associated with the first QoS profile.

According to another embodiment of this aspect, the first QoS profile corresponding to the first QoS level is available only for first QoS region users located in the first QoS region, the first QoS region users including users for which an operator of the first wireless communication network cell has agreed to implement the first QoS level. According to another embodiment of this aspect, the first QoS level is higher than the second QoS level.

According to another broad aspect of the disclosure, a node for configuring a QoS level for a wireless communication network bearer corresponding to a wireless device is provided. The node includes a processor, and a memory storing instructions that, when executed, configure the processor to assign a first QoS profile to the bearer when the wireless device is in a first QoS region served by a first wireless communication network cell. The first QoS profile corresponds to a first QoS level available in the first wireless communication network cell but not available to the wireless device in a second wireless communication network cell neighboring the first wireless communication network cell. The instructions, when executed, also configure the processor to determine when the wireless device begins a handover process with the second wireless communication network cell, where communication for the bearer is established between the wireless device and the second wireless communication network cell when the wireless device begins the handover process, the communication for the bearer being established using the first QoS profile but corresponding to a second QoS level different from the first QoS level.

According to one embodiment of this aspect, the processor is further configured to determine, after the handover process with the second wireless communication network cell, whether the wireless device is likely to return to the first QoS region served by the first wireless communication network cell and when it is determined that the wireless device is not likely to return to the first QoS region, assign a second QoS profile to the bearer, and when it is determined that the wireless device is likely to return to the first QoS region, maintain the first QoS profile.

According to another embodiment of this aspect, the first wireless communication network cell is an indoor cell and the second wireless communication network cell is an outdoor cell. According to another embodiment of this aspect, determining whether the wireless device is likely to return to the first QoS region includes starting a timer, and determining that a handover of the wireless device back to the first wireless communication network cell or another wireless communication network cell that serves the first QoS region has not occurred when the timer expires.

According to another embodiment of this aspect, determining whether the wireless device is likely to return to the first QoS region includes identifying movement of the wireless device in a direction away from the first QoS region. According to another embodiment of this aspect, determining whether the wireless device is likely to return to the first QoS region includes determining that the wireless device is within a predetermined geographic area within a second QoS region.

According to another embodiment of this aspect, the determination of whether the wireless device is likely to return to the first QoS region is made by at least one of a Mobile Management Entity (MME), a policy and charging rules function (PCRF), and a packet data network gateway (PDN GW).

According to another embodiment of this aspect, the first QoS corresponding to the first QoS profile is implemented in the first wireless communication network cell using a first set of QoS parameters and the second QoS level different from the first QoS level is implemented in the second wireless communication network cell using a second set of QoS parameters associated with the first QoS profile.

According to another embodiment of this aspect, the first QoS profile corresponding to the first QoS level is available only for first QoS region users located in the first QoS region, the first QoS region users including users for which an operator of the first wireless communication network cell has agreed to implement the first QoS level. According to another embodiment of this aspect, the first QoS level is higher than the second QoS level.

According to another broad aspect of the disclosure, a base station configured to communicate with a core network is provided. The core network configures a QoS level for a wireless communication network bearer corresponding to a wireless device by assigning a first QoS profile to the bearer when the wireless device is in a first QoS region served by a first wireless communication network cell. The first QoS profile corresponds to a first QoS level available in the first wireless communication network cell but not available to the wireless device in a second wireless communication network cell neighboring the first wireless communication network cell. The base station includes a processor, and a memory storing instructions that, when executed, configure the processor to establish communication for the bearer between the wireless device and the second wireless communication network cell when the wireless device begins a handover process with the second wireless communication network cell, the communication for the bearer being established using the first QoS profile but with a second QoS level different from the first QoS level.

According to one embodiment of this aspect, the first wireless communication network cell is an indoor cell and the second wireless communication network cell is an outdoor cell. According to one embodiment of this aspect, the first QoS level corresponding to the first QoS profile is implemented in the first wireless communication network cell using a first set of QoS parameters and the second QoS level different from the first QoS level is implemented in the second wireless communication network cell using a second set of QoS parameters associated with the first QoS profile.

According to another embodiment of this aspect, the first QoS profile corresponding to the first QoS level is available only for first QoS region users located in the first QoS region, the first QoS region users including users for which an operator of the first wireless communication network cell has agreed to implement the first QoS level.

According to another embodiment of this aspect, a determination of whether the wireless device is likely to return to the first QoS region is made by at least one of a Mobility Management Entity (MME), a policy and charging rules function (PCRF), and a packet data network gateway (PDN GW). According to another embodiment of this aspect, the first QoS level is higher than the second QoS level.

According to another broad aspect of the disclosure, a node for configuring a QoS level for a wireless communication network bearer corresponding to a wireless device is provided. The node includes a QoS assignment module configured to assign a first QoS profile to the bearer when the wireless device is in a first QoS region served by a first wireless communication network cell. The first QoS profile corresponds to a first QoS level available in the first wireless communication network cell but not available to the wireless device in a second wireless communication network cell neighboring the first wireless communication network cell. The node also includes a mobility prediction module configured to determine when the wireless device begins a handover process with the second wireless communication network cell, where communication for the bearer is established between the wireless device and the second wireless communication network cell when the wireless device begins the handover process, the communication for the bearer being established using the first QoS profile but corresponding to a second QoS level different from the first QoS level.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 9 is a block diagram of a base station constructed in accordance with the principles of the present disclosure; and FIG. 10 is a block diagram of a node including a QoS assignment module and a mobility prediction module constructed in accordance with the principles of the present disclosure.

DETAILED DESCRIPTION

Figure 1:
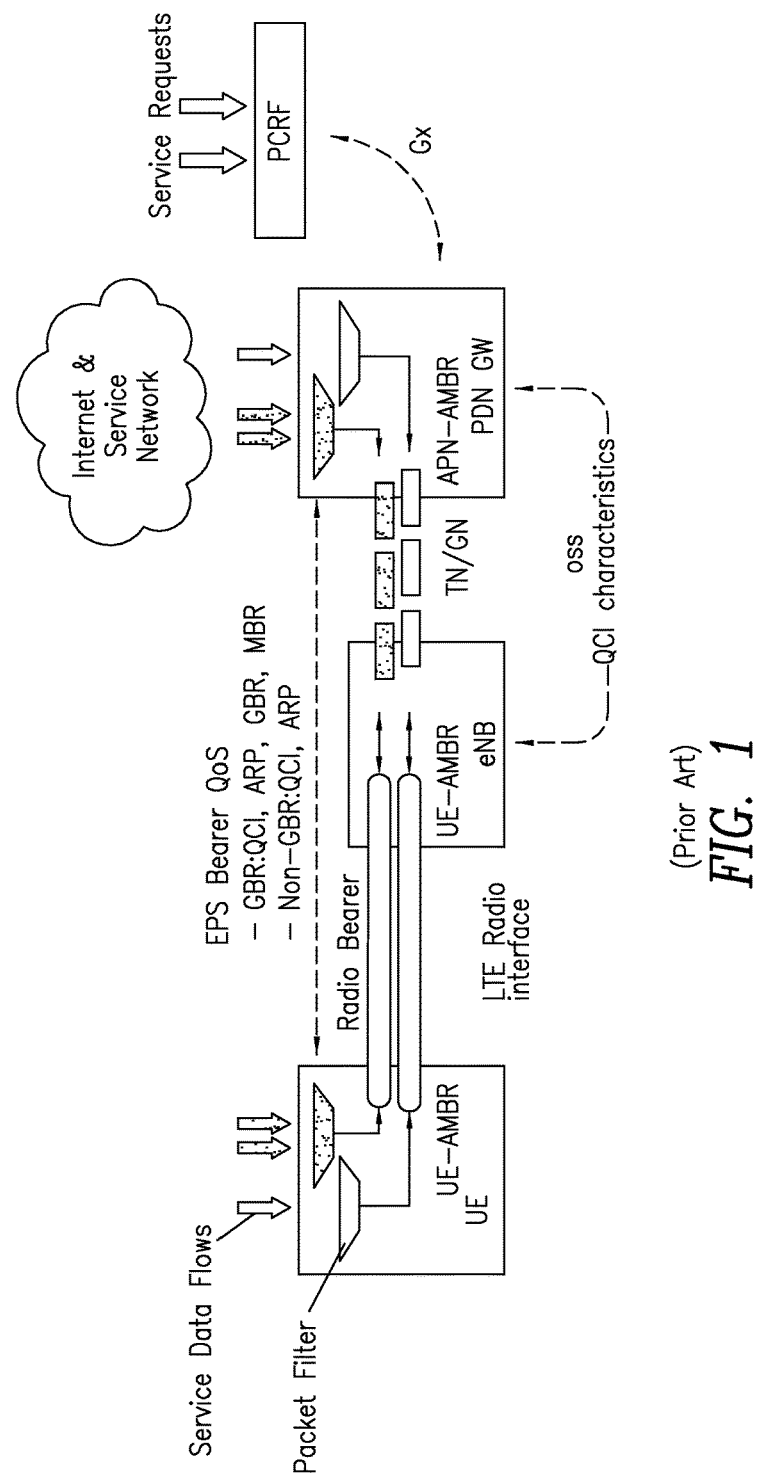
FIG. 1 is a block diagram of an LTE QoS network of the prior art.
Figure 2:
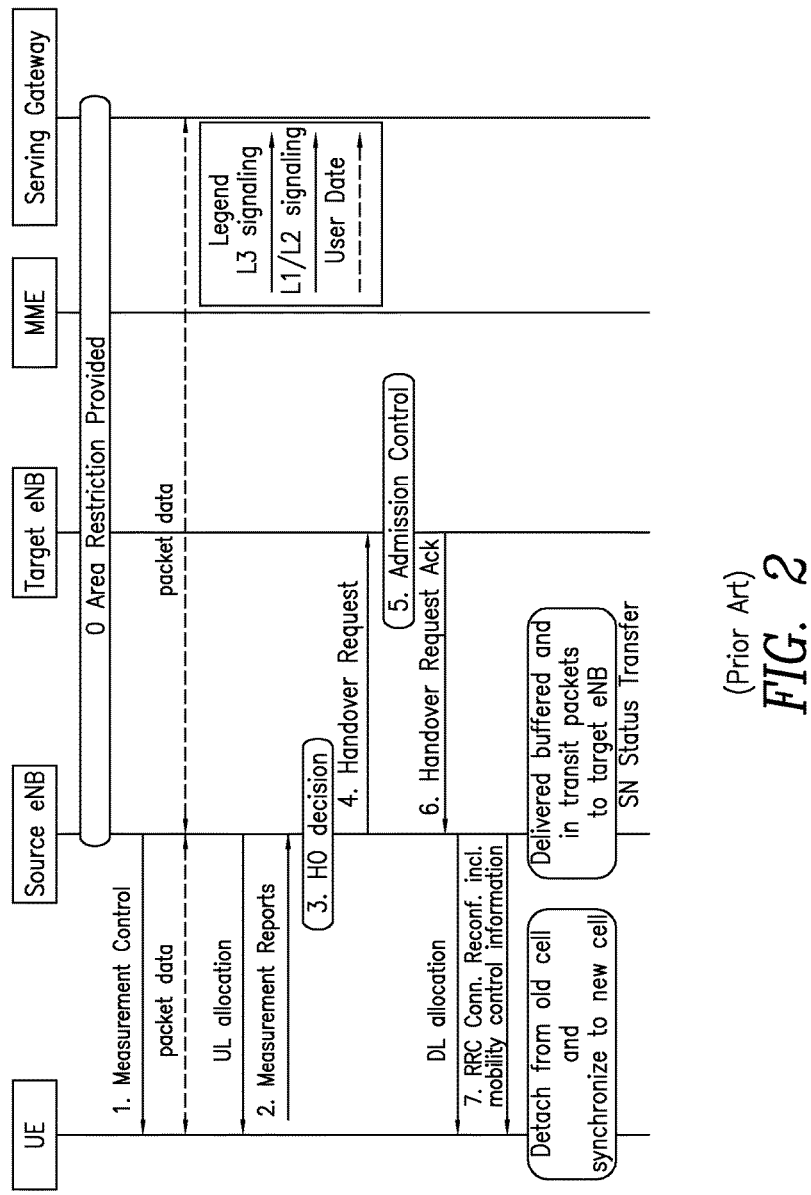
FIG. 2 is a diagram illustrating a known bearer modification and bearer QoS update procedure.

The present disclosure relates to methods, network nodes, and base stations for implementing methods for configuring a quality of service for wireless communication network bearers in a wireless communication system. In one embodiment, a first QoS profile is assigned to the bearer when the wireless device is in a first QoS region served by a first wireless communication network cell. For example, the first QoS region could be an indoor, or enterprise region often found in office buildings, hospitals or arenas. The first QoS profile corresponds to a first QoS level that is available in the first wireless communication network cell but is not available to the wireless device in a second wireless communication network cell neighboring the first wireless communication network cell, such as an outdoor/macro system. When the wireless device approaches the second wireless communication cell, a handover process with the second wireless communication network cell is initiated, and communication for the bearer between the wireless device and the second wireless communication network cell is established using the first QoS profile but corresponding to a second QoS level different from the first QoS level that was available in the first wireless communication network cell. In one embodiment, the first QoS level is higher than the second QoS level. In another embodiment, the first QoS level is lower than the second QoS level.

A benefit of the procedure described herein is that bearer modifications and the communication interruptions associated with them can be avoided because the bearer's QoS profile in the indoor region is maintained even after the wireless device has moved from the first cell to the second cell and the outdoor region. Further, rather than a default QoS profile being assigned to the bearer after handover, where the default QoS profile could correspond to a significantly different QoS level than the originally-assigned QoS level, the bearer QoS profile that was applied in the first cell is maintained and is mapped to an appropriate QoS level in the second cell. Further, in one embodiment, the completion of the handover and bearer modification can be delayed to ensure that the wireless device is actually moving from one system, e.g., the indoor system, to the other system e.g., the outdoor/macro system.

Before describing in detail exemplary embodiments that are in accordance with the disclosure, it is noted that the embodiments reside primarily in combinations of apparatus components and processing steps related to configuring a quality of service for wireless communication network bearers in the wireless communication system. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof. In addition, the terms "class" and "category" are used interchangeably herein as well as the terms "classifying" and "categorizing."

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 3:
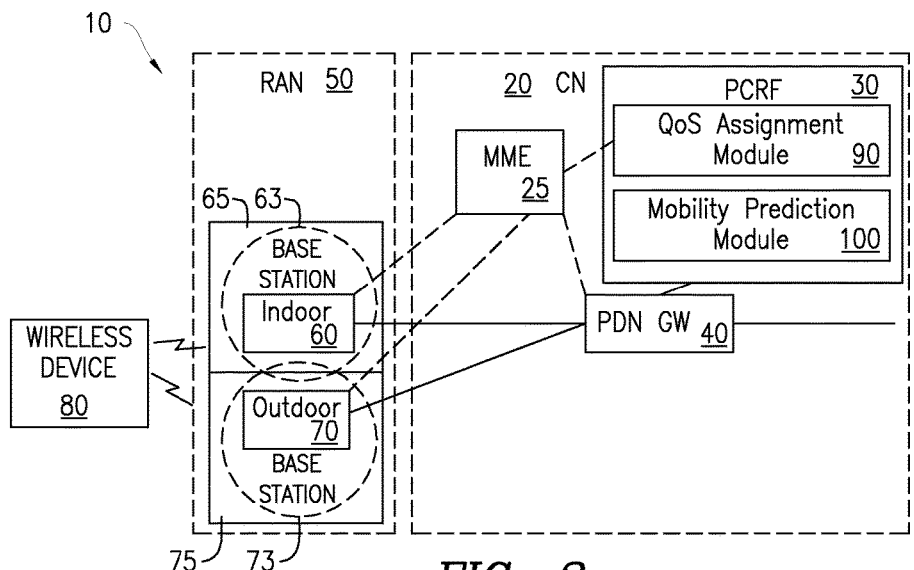
FIG. 3 is a block diagram illustrating indoor and outdoor QoS regions and their interaction with a wireless user device in accordance with the principles of the present disclosure.

Referring now to the drawing figures in which like reference designators refer to like elements there is shown in FIG. 3 an exemplary embodiment of the present disclosure. In FIG. 3, wireless communication system 10 includes a core network (CN) 20 having a Mobile management Entity (MME) 25, a PCRF 30 and, in certain embodiments, a PDN GW 40. System 10 may also include a Radio Access Network (RAN) 50. In one embodiment, RAN 50 includes a first base station 60 and a second base station 70. Each base station can be, for example, an evolved Node B (eNB). However, base stations 60 and 70 may also refer to a radio base station, base transceiver station, base station controller, network controller, Radio Network Controller (RNC), relay node, positioning node, Evolved-Serving Mobile Location Center (E-SMLC), location server, repeater, access point, radio access point, Core network node and/or MME, among other network nodes known in the art. In one embodiment, first base station 60 is associated with a first wireless communication network cell 63 operating in a first region 65 such as an indoor or "enterprise" region. Second base station 70 is associated with a second wireless communication network cell 73 operating in a second region 75 such as an outdoor or "macro" region. Wireless device 80, which may include, for example, user equipment (UE), including devices used for machine type communication, machine to machine communication, sensors, USB, wireless embedded devices, laptop mounted devices, tablet computers, etc., is in wireless communication with both first base station 60 and second base station 70.

A wireless device user with wireless device 80 may be located within first region 65, which, in one embodiment, is a first QoS region such as an indoor, or enterprise region often associated with office buildings, hospitals, etc. This first QoS region 65 is served by a first wireless communication network cell 63. In one embodiment, the first QoS profile corresponding to the first QoS region 65 is available only for first QoS region users located in the first QoS region 65 where the first QoS users including users for which an operator of first wireless communication network cell 63 has agreed to implement the first QoS level. The first QoS region users may be, for example, a specific set of users that are employed at a building associated with first QoS region 65 and/or a specific set of users who have a subscription that authorizes their use of the first QoS profile in first QoS region 65. As will be discussed in further detail below, in one embodiment, PCRF entity 30 includes a QoS Assignment Module 90 configured to assign a first QoS profile to a bearer when wireless device 80 is in first QoS region 65 served by first wireless communication network cell 63. The first QoS profile is a bearer service level profile corresponding to a first QoS level that is available in first wireless communication network cell 63 but is not available to wireless device 80 in a second wireless communication network cell 73 neighboring first wireless communication network cell 63, i.e., the second network cell 73 associated with second region 75. The first QoS level may be unavailable to any wireless device in second wireless communication network cell 73, but in some embodiments it is available only for wireless devices used by a select few users, such as firefighters, police, and/or other emergency service personnel.

PCRF entity 30 also includes a Mobility Prediction Module 100 configured to determine when wireless device 80 begins a handover process with second wireless communication network cell 73 and to predict the likelihood of wireless device 80 moving from one region, i.e., first QoS region 65, to another region, i.e., second QoS region 75. Communication for the bearer is established between wireless device 80 and second wireless communication network cell 73 when wireless device 80 begins the handover process. Communication for the bearer is established using the first QoS profile, i.e., the profile associated with indoor region 65 but with a QoS level different from the first QoS level that is available in first wireless communication network cell 63. In an alternate embodiment, for example when core network 20 does not include PCRF entity 30, both QoS Assignment Module 90 and Mobility Prediction Module 100 are located within PDN GW 40.

Figure 4:
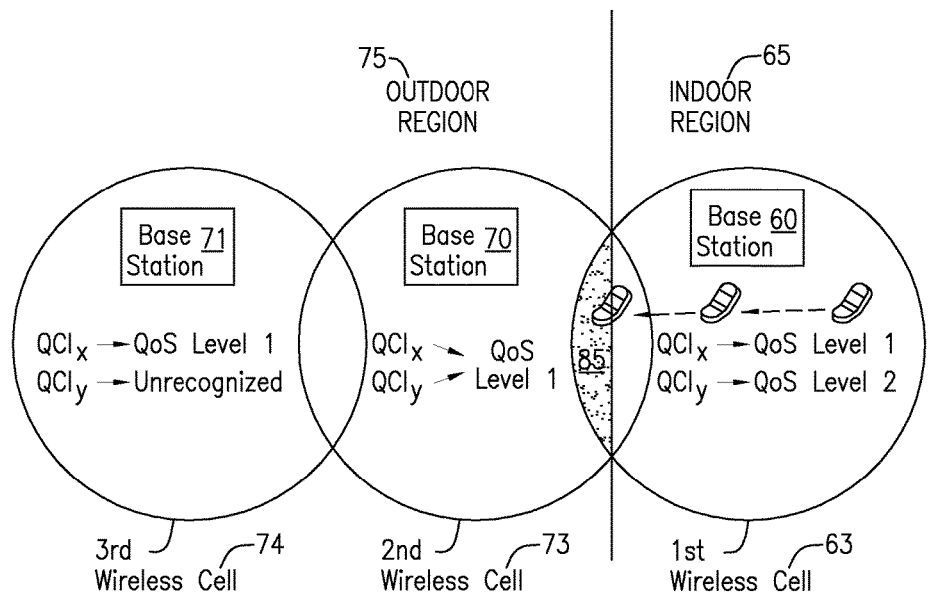
FIG. 4 is a block diagram illustrating the movement of a wireless device from an indoor region to an outdoor region in accordance with the principles of the present disclosure.

FIG. 4 illustrates a scenario where a wireless device 80 moves from a first indoor region 65, to a second neighboring region 75, in this instance an outdoor region. For example, wireless device 80 may be located in an office building that has indoor cellular coverage associated with a particular QoS level. The indoor cellular coverage associated with indoor region 65 may have an enhanced QoS level for indoor users when compared to the QoS level associated with outdoor region 75. For example, the QCI index for a particular bearer associated with the indoor (enhanced) QoS level may be QCI=y, and the QCI index for the bearer associated with the outdoor QoS level may be configured to provide a general and lower QoS level for the same wireless device 80, i.e., QCI=x.

In the present disclosure, base station 70, associated with second wireless cell 73 is configured to accept QCI=y for the bearer, which is the QoS profile associated for the bearer in the indoor region 65. However, base station 70 will treat the wireless device 80 according to the configuration of QCI=x, which is the profile of service associated with outdoor region 75. In other words, when the wireless device 80 leaves the indoor region 65, a handover procedure will occur and will request the same QoS profile (QCI=y) as assigned to the bearer in the indoor region 65. However, since base station 70 is advantageously configured to accept QCI=y for the bearer, the wireless device 80 will keep QCI=y but will be treated according to the configuration of QCI=x. In other words, the target base station 70 which is located in outdoor region 75 and is a neighbor to indoor region 65, is configured to support the indoor QoS profile, QCI=y, but points towards a configuration of the actual outdoor region QoS profile, i.e., QCI=x. Thus, from the perspective of core network 20, outdoor region 75 supports the source QoS profile, i.e., QCI=y, and, therefore, no bearer update is required. At the same time, the indoor QoS profile is only enforced when wireless device 80 is in indoor region 65 and not when the wireless device 80 is in outdoor region 75. This leaves other outdoor, macro subscribers unaffected.

After wireless device 80 has moved to outdoor region 75, data traffic is exchanged between wireless device 80 and the outdoor base station 70. According to an embodiment of the present disclosure, the data traffic is scheduled with proper scheduling parameters even when the QCI of the bearer is specific to the indoor region (QCI=y). This is achieved in the neighbor secondary (outdoor) cell 73 associated with outdoor region 75, by mapping QCI=y for this bearer to a QCI that the second wireless communication network cell 73 is configured to support, such as QCI=x, or to a QoS configuration corresponding to such a QCI. In this fashion, because there is no need to modify the QoS profile for wireless device 80 back from QCI=y (its QoS profile when in indoor region 65) to QCI=x (the QoS profile associated with outdoor region 75), bearer modification is avoided.

As will be described in further detail below, in certain instances, the wireless device 80 may approach an edge of one region, i.e., indoor region 65 and move towards another region, i.e., outdoor region 75. Advantageously, the present disclosure describes methods that determine the likelihood of wireless device 80 returning to one region from another, and can appropriately adjust or maintain the QoS profile for the bearer. Referring to FIG. 4, wireless device 80 can approach the boundary of indoor region 65, where it is currently being served by first wireless communication cell 63. At a certain location, a handover process is initiated and second wireless communication cell 73 takes over service of wireless device 80. If it is determined, after the handover process with second wireless communication network cell 73, that wireless device 80 is not likely to return to the indoor (first QoS) region 65 served by first wireless communication network cell 63, a second QoS profile is assigned to the bearer. If is determined that the wireless device 80 is likely to return to the indoor (first QoS) region 65, the first QoS profile for the bearer is maintained.

Outdoor region 75 may include other wireless cells, e.g., a third wireless communication cell 74, that neighbor the second wireless communication cell 73 but are not configured to support an enhanced QoS profile, i.e. QCI=y. However, by the time wireless device 80 reaches third wireless communication cell 74 (or a similar neighboring cell in the outdoor region 75), it will have already been determined that wireless device 80 is not likely to return to indoor region 65 and the bearer will have been assigned a QoS profile that is supported by a base station 71 of third wireless communication cell 74.

The likelihood of wireless device 80 returning to a region can be determined in several ways. For example, in one embodiment, a timer within PCRF 30 or PDN GW 40 can be set, where the timer has a start time and an end time and it is determined that a handover of wireless device 80 back to the first wireless network cell 63 has not occurred by the end time. In other words, at the occurrence of the end time of the timer a handover of wireless device 80 back to first wireless communication cell 63 has not occurred, then the user's intent is to leave the first region and enter the second region. In other words, if a wireless device user begins walking away from indoor region 65 towards outdoor region 75 and at the end of a predetermined amount of time has not returned back to indoor region 65, then it can be assumed that the wireless device user has no intention of returning to indoor region 65, and a second QoS profile can be assigned for the bearer. If the wireless device 80 returns to indoor region 65 within a predetermined amount of time, then the first QoS profile associated with indoor region 65 is maintained for the bearer.

In another embodiment, the location of wireless device 80 is tracked and if movement of wireless device 80 is identified to be in a direction away from the first QoS region (indoor region 65) and towards outdoor region 75 then it can be assumed that the wireless device user's intent is to leave indoor region 65 and enter outdoor region 75. In another embodiment, the wireless device user's intent to leave the indoor region can be determined by ascertaining whether wireless device 80 is within a predetermined geographic area 85 within second QoS region, i.e., outdoor region 75. For example, as can be seen in FIG. 4, the user of wireless device 80 is within indoor region 65 and moves towards an edge of first wireless cell 63. At a certain point, handover from first wireless cell 63 to second wireless cell 73 occurs and communication with wireless device 80 is taken over by second wireless cell 73. However, although the wireless device user has moved within the range of second wireless cell 73, the user may still have intentions of remaining in indoor region 65. For example, the user may step outside of a door from his or her office building to smoke or grab some fresh air with the intent of returning to their office building shortly thereafter. However, if it is determined that wireless device 80 moves further away from indoor region 65 towards a certain geographic region 85 within outdoor region 75, shown by the shaded area in FIG. 4, this may likely mean that the it is not likely that wireless device 80 will return to indoor region 65 but instead will enter and remain in outdoor region 75. Thus, by entering a predetermined geographic area within outdoor region 75, it can be determined that wireless device 80 is likely to leave the first QoS region (indoor region 65) served by first wireless cell 63 and enter a second QoS region (outdoor region 75) serviced by second wireless cell 73. This method assures, with some degree of certainty, that wireless device 80 has moved to outside region 75. The methods described above for determining of the likelihood of wireless device 80 leaving one region, (i.e., the first QoS region) and enter another region (i.e., the second QoS region) is made by at least one of MME 25, PCRF 30 and PDN GW 40.

As discussed above, in one embodiment, indoor region 65 is considered a high QoS region and corresponds to a high QoS available in first wireless communication network cell 63. When wireless device 80 is within indoor region 65 and is being served by first wireless cell 63, a first QoS profile (i.e., QCI=y) for a particular bearer is implemented. This first QoS profile is not available in second wireless cell 73 associated with outdoor region 75. When the wireless device 80 moves to outdoor region 75, handover to second wireless cell 73 occurs and communication is established with second wireless cell 73. After wireless device 80 has moved to outdoor region 75, communication with second wireless cell 73 is established while still maintaining the first (high) QoS profile (i.e., QCI=y) although actual communication occurs at a lower QoS than the first (high) QoS profile.

In one embodiment, the first QoS corresponding to the first QoS profile is implemented in the first wireless communication network cell 63 in indoor region 65 using a first set of QoS parameters. When wireless device 80 moves to outdoor region 75, the QoS lower than the first QoS is implemented in second wireless communication network cell 73 using a second set of QoS parameters associated with the first QoS profile. In other words, after handover, no bearer modification takes place because the QoS associated with the indoor region 65 (i.e., QCI=y) is maintained for the bearer, because outdoor region 75 has been configured for the first QoS. In actuality, although no bearer modification is needed, a different set of parameters are applied to wireless device 80 so that other non-neighboring base stations can maintain their parameters.

Figure 5:
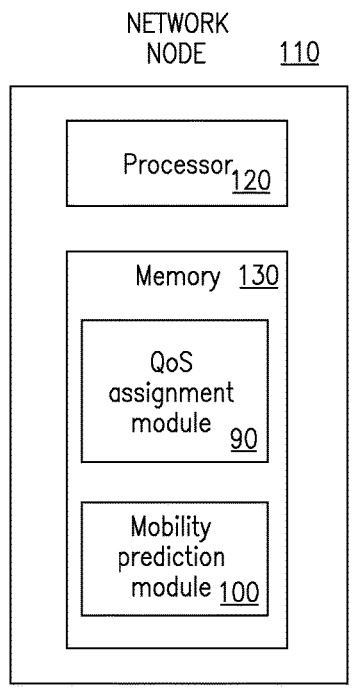
FIG. 5 is a block diagram of an exemplary node configured to determine a QoS for wireless communication network bearers in a wireless communication system constructed in accordance with the principles of the present disclosure.

FIG. 5 illustrates a block diagram of a network node 110 for configuring a QoS for a wireless communication network bearer corresponding to wireless device 80, according to an embodiment of the present disclosure. In one embodiment, network node 110 can be MME 25, PCRF 30 or PDN GW 40 located in core network 20. Network node 110 can include a processor 120 and memory 130. Memory 130 may include non-volatile and/or volatile memory. For example, non-volatile memory may include a hard drive, flash memory, programmable integrated circuits, memory stick, solid state memory and the like. Also, volatile memory may include random access memory and others known in the art. Memory 130 stores program instructions such as those for QoS assignment determination module 90 and Mobility Prediction Module 100. For example, memory 130 stores instructions that, when executed by processor 120, configures processor 120 to invoke QoS assignment determination module 90. QoS assignment determination module 90 includes instructions, which when executed by processor 120 assigns a first QoS profile to the bearer when wireless device 80 is in a first QoS region such as indoor region 65 served by first wireless cell 63. The first QoS profile corresponds to a first QoS that is available in first wireless cell 63 but that is not available to wireless device 80 in second wireless cell 73 neighboring the first wireless cell 63.

Memory 130 also stores instructions that, when executed by processor 120, configures processor 120 to invoke Mobility Prediction Module 100. Mobility Prediction Module 100 includes instructions, which when executed by processor 120 determines when wireless device 80 begins a handover process with the cell. When it is determined that wireless device 80 begins the handover process with the second wireless communication network cell 73, communication for the bearer is established between wireless device 80 and second wireless communication network cell 73 when wireless device 80 begins the handover process. As discussed above, communication for the bearer is established using the first QoS profile but with a QoS level different than the level corresponding to the first QoS profile.

Mobility Prediction Module 100 of network node 110 is further configured to determine, after the handover process with the second wireless communication network cell 73, whether wireless device 80 is likely to return to the first QoS region served by the first wireless communication network cell 63. When it is determined that the wireless device 80 is not likely to return to the first QoS region, processor 120 assigns a second QoS profile to the bearer. When it is determined that wireless device 80 is likely to return to the first QoS region 65, processor 120 maintains the first QoS profile. In one embodiment, first wireless communication network cell 63 is an indoor cell and second wireless communication network cell 73 is an outdoor cell.

In one embodiment, determining whether wireless device 80 is likely to return to the first QoS region 65 includes starting a timer, and determining that a handover of wireless device 80 back to first wireless communication network cell 63 or another wireless communication network cell that serves the first QoS region has not occurred when the timer expires.

In another embodiment, determining whether wireless device 80 is likely to return to the first QoS region 65 includes identifying movement of wireless device 80 in a direction away from the first QoS region 65. In another embodiment, determining whether wireless device 80 is likely to return to the first QoS region 65 includes determining that wireless device 80 is within a predetermined geographic area 85 within second QoS region 75.

As discussed above, in one embodiment, network node 110, which determines whether wireless device 80 is likely to return to first QoS region 65, can be at least one of MME 25, PCRF 30 and PDN GW 40. Further, in one embodiment, the first QoS profile corresponding to the first QoS level is available only for first QoS region users located in the first QoS region 65, the first QoS region users including users for which an operator of first wireless communication network cell 63 has agreed to implement the first QoS level.

Note that QoS assignment determination module 90, Mobility Prediction Module 100 and other modules are described herein as including one or more processors and memory devices. However, the present disclosure is not limited to such. It is contemplated that the QoS assignment determination module 90 and other modules can also be implemented in hardware, such as an application specific integrated circuit (ASIC), programmable gate array (PGA) and the like.

Figure 6:
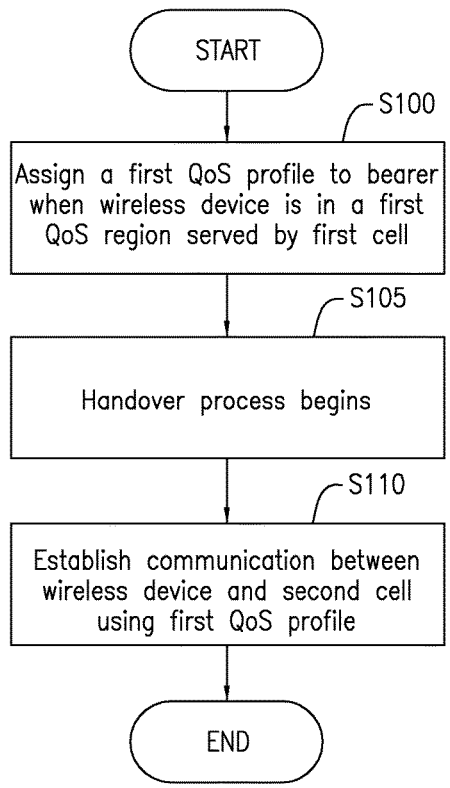
FIG. 6 is a flowchart of an exemplary QoS profile configuring process for a wireless communication network bearer in accordance with the principles of the present disclosure.

In FIG. 6, a flow diagram is shown, representing an embodiment of the present disclosure. The process shown in FIG. 6 may be performed by PCRF 30, PDN GW 40, or a combination of the two. In this embodiment, a first QoS profile is assigned to a bearer in a wireless communication system when wireless device 80 is in a first QoS region, i.e., indoor region 65 that is served by first wireless cell 73 (Block S100). The first QoS level available in first wireless cell 63 is not available in second wireless cell 73 neighboring the first wireless cell 63. After a handover process has begun (Block S105), communication is established between wireless device 80 and second wireless cell 73 using the first QoS profile (Block S110).

Figure 7:
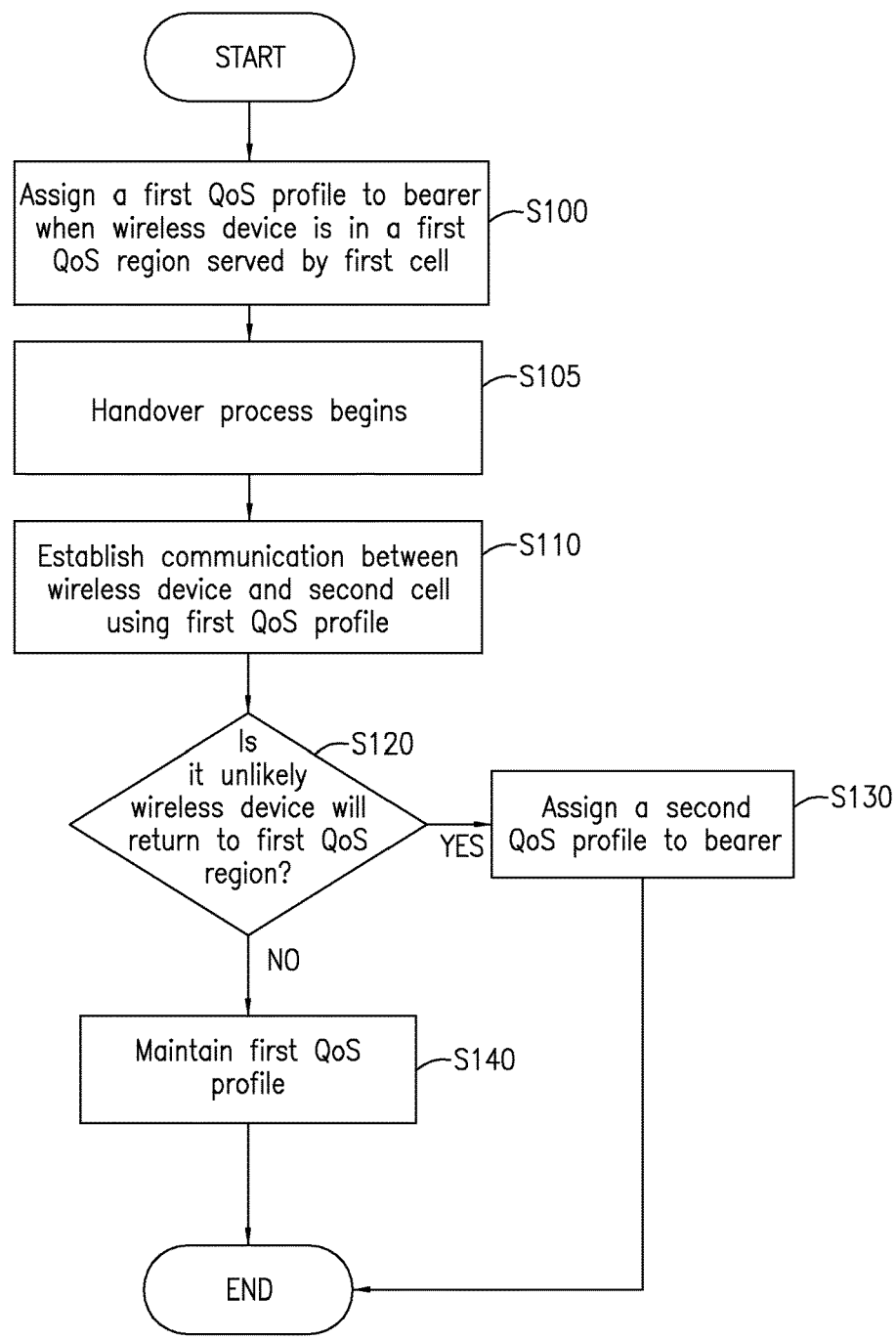
FIG. 7 is a flowchart of another exemplary QoS profile configuring process for a wireless communication network bearer in accordance with the principles of the present disclosure.

In FIG. 7, a flow diagram is shown, representing an alternate embodiment of the present disclosure. The steps shown in FIG. 7 may be performed by PCRF 30, PDN GW 40, or a combination of the two. In this embodiment, as in the embodiment shown in FIG. 6, a first QoS profile is assigned to a bearer in a wireless communication system when wireless device 80 is in a first QoS region, i.e., indoor region 65 that is served by first wireless cell 63 (Block S100). In one embodiment, the first QoS level available in first wireless cell 63 is not available in second wireless cell 73 neighboring the first wireless cell 63. After a handover process has begun (Block S105), communication is established between wireless device 80 and second wireless cell 73 using the first QoS profile (Block S110). It is then determined whether it is unlikely that wireless device 80 will return to the first QoS region 65 (Block S120). This can be performed by one or more of the methods described above. If it is determined that it is unlikely that wireless device 80 will return to the first QoS region 65, a second QoS profile is assigned to the bearer (Block S130). If it is determined that it is likely that wireless device 80 will return to the first QoS region 65, the first QoS profile is maintained (Block S140).

Figure 8:
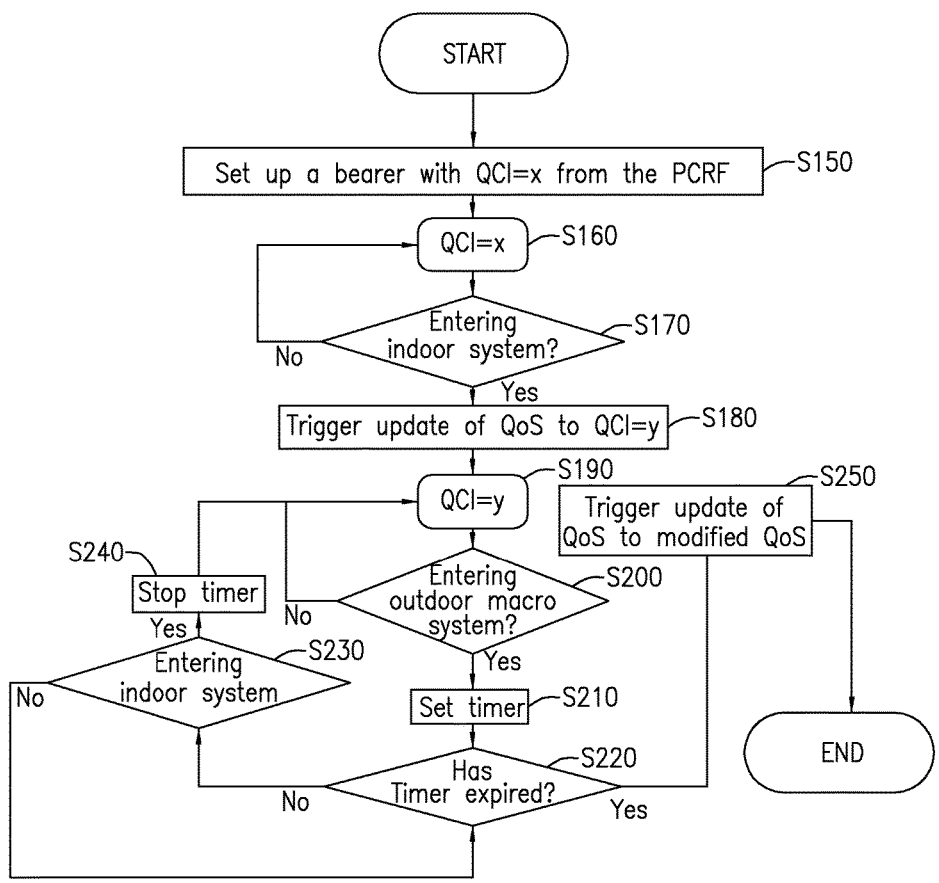
FIG. 8 is a flowchart of yet another exemplary QoS profile configuring process for a wireless communication network bearer using a timer to determine the user's intent in accordance with the principles of the present disclosure.

FIG. 8 is a flow diagram describing yet another embodiment of the present disclosure. The process shown in FIG. 8 may be performed by MME 25, PCRF 30, PDN GW 40, or a combination of the two. Thus, although the description below may describe the method being performed by PCRF 30, it is within the scope of the present disclosure to have the steps performed by PCRF 30, PDN GW 40, a combination of the two, or by one or more other entities within core network 20. In this embodiment, a wireless device is initially located in outdoor region 75 and connected to a wireless cell that handles communication with wireless device 80. PCRF 30 assigns to a bearer a QoS profile associated with outdoor region 75, i.e. QCI=x (Block S150). Thus, a QoS profile associated with outdoor region 75 (QCI=x) is assigned to the bearer when the wireless device 80 is outdoors (Block S160). When it is determined that the wireless device 80 has moved to indoor region 65 and has connected to first wireless cell 63 associated with indoor region 65 (Block S170), a handover event occurs, assigning to the bearer the same QoS profile (QCI=x) as used in outdoor region 75 (Block S180).

With the bearer QoS profile set for indoor region 65, i.e., QCI=y (Block S190), it is determined if the wireless device 80 is has moved away from indoor region 65 and has entered outdoor region 75 (Block S200). If the wireless device has not entered outdoor region 75, the indoor QoS profile is maintained. If the wireless device 80 is entering outdoor region 75, a handover procedure will request the same QoS profile as assigned to the bearer in indoor region 65, i.e., QCI=y. Because outdoor region 75 is configured to accept the QoS profile for the bearer associated with indoor region 65 (QCI=y), the wireless device 80 will maintain the indoor QoS profile, i.e., QCI=y, but will be treated according to a set of parameters associated with the outdoor QoS profile, namely, QCI=x, rather than QCI=y. Because the indoor QoS is maintained, no bearer modification is necessary.

When PCRF 30 recognizes that a handover to second wireless cell 73 has occurred, PCRF 30 sets a timer (Block S210). The timer is then checked (Block S220) and if it the timer has not expired, it is determined if wireless device 80 has reentered indoor region 65 (Block S230). If the wireless device 80 has reentered indoor region 65 before the expiration of the timer, the timer is stopped (Block S240) and the QoS profile remains at the profile associated with indoor region 65, QCI=y. In this scenario, PCRF 30 recognizes another handover back to first wireless cell 63 corresponding to indoor region 65 meaning the wireless device 80 has returned to indoor region 65. However, if the timer has expired and wireless device 80 has not reentered the indoor region 65, a modified QoS profile is assigned to the bearer (Block S250). Since outdoor region 75 is configured to accept the QoS profile associated with indoor region 65 (QCI=y), the wireless device 80 will keep QCI=y and the bearer it had while in indoor region 65 but will be treated according to the configuration of outdoor region 75, i.e., QCI=x and its associated parameters. This can be accomplished by either translating QCI=y to QCI=x or by mapping QCI=y to the configuration of QCI=x.

FIG. 9 illustrates an exemplary base station in accordance with the principles of the present disclosure. The base station shown in FIG. 9 may be either base station 60 associated with indoor region 65 or base station 70 associated with outdoor region 75. For simplicity, base station 70 is used. Base station 70 is configured to communicate with core network 20. As described above, core network 20 configures a QoS level for a wireless communication network bearer corresponding to wireless device 80 by assigning a first QoS profile to the bearer when wireless device 80 is in a first QoS region 65 served by a first wireless communication network cell 63, the first QoS profile corresponding to a first QoS available in the first wireless communication network cell 63 but not available to wireless device 80 in a second wireless communication network cell 73 neighboring the first wireless communication network cell 63.

Base station 70 may include processor 120 and memory 130. Memory 130 stores program instructions such as those for communication establishment module 140. For example, memory 130 stores instructions that, when executed by processor 120, configures processor 120 to invoke communication establishment module 140. Communication establishment module 140 includes instructions, which when executed by processor 120 establishes communication for the bearer between wireless device 80 and the second wireless cell 73 associated with outdoor region 75 when wireless device 80 begins a handover process with second wireless cell 73. The communication for the bearer is established using the first QoS profile, i.e., QCI=y, but the QoS level is modified such that the second QoS level is different from the first QoS level associated with indoor region 65. In one embodiment, first wireless communication network cell 63 is an indoor cell and second wireless communication network 73 is an outdoor cell. In one embodiment, the first QoS level is higher than the second QoS level.

In another embodiment, the first QoS level corresponding to the first QoS profile is implemented in the first wireless communication network cell 63 using a first set of QoS parameters and the second QoS level different from the first QoS level is implemented in the second wireless communication network cell 73 using a second set of QoS parameters associated with the first QoS profile. In another embodiment, the first QoS profile corresponding to the first QoS level is available only for first QoS region users located in the first QoS region 65, the first QoS users including users for which an operator of the first wireless communication network cell 63 has agreed to implement the first QoS level. A determination of whether wireless device 80 is likely to return to the first QoS region 65 is made by at least one of MME 25, PCRF 30, and PDN GW 40.

FIG. 10 illustrates an exemplary network node 110 in accordance with the principles of the present disclosure. Network node 110 can be, for example, PCRF 30 or PDN GW 40, described above. Network node 110 includes QoS assignment module 90 and Mobility Prediction Module 100. QoS assignment determination module 90 may include a processor and memory where the memory includes instructions, which when executed by the processor assigns a first QoS profile to the bearer when wireless device 80 is in a first QoS region such as indoor region 65 served by first wireless cell 63. The first QoS profile corresponds to a first QoS level that is available in first wireless cell 63 but that is not available in second wireless cell 73 neighboring the first wireless cell 63. Mobility Prediction Module 100 may also include a processor and memory where the memory includes instructions, which when executed by the processor determines when wireless device 80 begins a handover process with the second wireless cell 73. When the handover process begins, communication for the bearer is established between wireless device 80 and second wireless cell 73. As discussed above, communication for the bearer is established using the first QoS level but with a second QoS level different than for the first QoS level.

As will be appreciated by one of skill in the art, the concepts described herein may be embodied as a method, data processing system, and/or computer program product. Accordingly, as noted above, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that may be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that may direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Although some of the diagrams include arrows on communication paths to show a primary direction of communication, it is to be understood that communication may occur in the opposite direction to the depicted arrows. Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments may be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope of the disclosure, which is limited only by the following claims.

What is claimed is:

1. A method for configuring a quality of service, QoS, level for a wireless communication network bearer corresponding to a wireless device, the method comprising:
assigning a first QoS profile to the bearer when the wireless device is in a first QoS region served by a first wireless communication network cell, the first QoS profile corresponding to a first QoS level available in the first wireless communication network cell but not made available by a network operator to the wireless device in a second wireless communication network cell neighboring the first wireless communication network cell;
establishing communication for the bearer between the wireless device and the second wireless communication network cell when the wireless device begins a handover process with the second wireless communication network cell, the communication for the bearer being established using the first QoS profile but corresponding to a second QoS level different from the first QoS level, wherein the first QoS level corresponding to the first QoS profile is implemented in the first wireless communication network cell using a first set of QoS parameters and the second QoS level different from the first QoS level is implemented in the second wireless communication network cell using a second set of QoS parameters associated with the first QoS profile;

determining, after the handover process with the second wireless communication network cell is successful, whether the wireless device is likely to return to the first QoS region served by the first wireless communication network cell;

determining whether the wireless device is likely to return to the first QoS region comprises:
   starting a timer; and
   determining that a handover of the wireless device back to the first wireless communication network cell or another wireless communication network cell that serves the first QoS region has not occurred when the timer expires;

when it is determined that the wireless device is not likely to return the first QoS region, assigning a second QoS profile to the bearer; and when it is determined that the wireless device is likely to return to the first QoS region, maintaining the first QoS profile.

2. The method of claim 1, wherein the first wireless communication network cell is an indoor cell and the second wireless communication network cell is an outdoor cell.

3. The method of claim 1, wherein determining whether the wireless device is likely to return to the first QoS region comprises:
   identifying movement of the wireless device in a direction away from the first QoS region.

4. The method of claim 1, wherein determining whether the wireless device is likely to return to the first QoS region comprises:
   determining that the wireless device is within a predetermined geographic area within a second QoS region.

5. The method of claim 1, wherein determining whether the wireless device is likely to return to the first QoS region is made by at least one of a Mobile Management Entity, MME, a policy and charging rules function, PCRF, and a packet data network gateway, PDN GW.

6. The method of claim 1, wherein the first QoS profile corresponding to the first QoS level is available only for first QoS region users located in the first QoS region, the first QoS region users including users for which an operator of the first wireless communication network cell has agreed to implement the first QoS level.

7. The method of claim 1, wherein the first QoS level is higher than the second QoS level.

8. The method of claim 1, wherein the first QoS profile includes a QoS Class Identifier (QCI), the QCI being mapped to the first QoS level in the first wireless communication network cell and being mapped to the second QoS level in the second wireless communication network cell.

9. The method of claim 8, wherein the QCI is mapped to the second QoS level by mapping the QCI to another QCI that corresponds to the second QoS level and that the second wireless communication network cell is configured to support.

10. A node for configuring a quality of service, QoS, level for a wireless communication network bearer corresponding to a wireless device, the node comprising:
   a processor; and
   a memory storing instructions that, when executed, configure the processor to:
      assign a first QoS profile to the bearer when the wireless device is in a first QoS region served by a first wireless communication network cell, the first QoS profile corresponding to a first QoS level available in the first wireless communication network cell but not made available by a network operator to the wireless device in a second wireless communication network cell neighboring the first wireless communication network cell; and
      determine when the wireless device begins a handover process with the second wireless communication network cell, where communication for the bearer is established between the wireless device and the second wireless communication network cell when the wireless device begins the handover process, the communication for the bearer being established using the first QoS profile but corresponding to a second QoS level different from the first QoS level, wherein the first QoS level corresponding to the first QoS profile is implemented in the first wireless communication network cell using a first set of QoS parameters and the second QoS level different from the first QoS level is implemented in the second wireless communication network cell using a second set of QoS parameters associated with the first QoS profile;
      determine, after the handover process with the second wireless communication network cell is successful, whether the wireless device is likely to return to the first QoS region served by the first wireless communication network cell:
      determine whether the wireless device is likely to return to the first QoS region comprises:
         starting a timer; and
         determining that a handover of the wireless device back to the first wireless communication network cell or another wireless communication network cell that serves the first QoS region has not occurred when the timer expires;
      when it is determined that the wireless device is not likely to return to the first QoS region, assigning a second QoS profile to the bearer; and
      when it is determined that the wireless device is likely to return to the first QoS region, maintaining the first QoS profile.

11. The node of claim 10, wherein the first wireless communication network cell is an indoor cell and the second wireless communication network cell is an outdoor cell.

12. The node of claim 10, wherein determining whether the wireless device is likely to return to the first QoS region comprises:
   identifying movement of the wireless device in a direction away from the first QoS region.

13. The node of claim 10, wherein determining whether the wireless device is likely to return to the first QoS region comprises:
   determining that the wireless device is within a predetermined geographic area within a second QoS region.

14. The node of claim 10, wherein determining whether the wireless device is likely to return to the first QoS region is made by at least one of a Mobility Management Entity, MME, a policy and charging rules function, PCRF, and a packet data network gateway, PDN GW.

15. The node of claim 10, wherein the first QoS profile corresponding to the first QoS level is available only for first QoS region users located in the first QoS region, the first QoS region users including users for which an operator of the first wireless communication network cell has agreed to implement the first QoS level.

16. The node of claim 10, wherein the first QoS level is higher than the second QoS level.

17. A base station configured to communicate with a core network, the core network configuring a quality of service, QoS, level for a wireless communication network bearer corresponding to a wireless device by assigning a first QoS profile to the bearer when the wireless device is in a first QoS region served by a first wireless communication network cell, the first QoS profile corresponding to a first QoS level available in the first wireless communication network cell but not made available by a network operator to the wireless device in a second wireless communication network cell neighboring the first wireless communication network cell, the base station comprising:
 a processor; and
 a memory storing instructions that, when executed, configure the processor to:
  establish communication for the bearer between the wireless device and the second wireless communication network cell when the wireless device begins a handover process with the second wireless communication network cell, the communication for the bearer being established using the first QoS profile but corresponding to a second QoS level different from the first QoS level, wherein the first QoS level corresponding to the first QoS profile is implemented in the first wireless communication network cell using a first set of QoS parameters and the second QoS level different from the first QoS level is implemented in the second wireless communication network cell using a second set of QoS parameters associated with the first QoS profile;
  determine, after the handover process with the second wireless communication network cell is successful, whether the wireless device is likely to return to the first QoS region served by the first wireless communication network cell;
  determine whether the wireless device is likely to return to the first QoS region comprises:
   starting a timer; and
   determining that a handover of the wireless device back to the first wireless communication network cell or another wireless communication network cell that serves the first QoS region has not occurred when the timer expires;
  when it is determined that the wireless device is not likely to return the first QoS region, assigning a second QoS profile to the bearer; and
  when it is determined that the wireless device is likely to return to the first QoS region, maintaining the first QoS profile.

18. The base station of claim 17, wherein the first wireless communication network cell is an indoor cell and the second wireless communication network cell is an outdoor cell.

19. The base station of claim 17, wherein the first QoS profile corresponding to the first QoS level is available only for first QoS region users located in the first QoS region, the first QoS region users including users for which an operator of the first wireless communication network cell has agreed to implement the first QoS level.

20. The base station of claim 17, wherein the determination of whether the wireless device is likely to return to the first QoS region is made by at least one of a Mobility Management Entity, MME, a policy and charging rules function, PCRF, and a packet data network gateway, PDN GW.

21. The base station of claim 17, wherein the first QoS level is higher than the second QoS level.

22. A node for configuring a quality of service, QoS, level for a wireless communication network bearer corresponding to a wireless device, the node comprising:
 a QoS assignment module configured to assign a first QoS profile to the bearer when the wireless device is in a first QoS region served by a first wireless communication network cell, the first QoS profile corresponding to a first QoS level available in the first wireless communication network cell but not made available by a network operator to the wireless device in a second wireless communication network cell neighboring the first wireless communication network cell; and
 a mobility prediction module configured to:
  determine when the wireless device begins a handover process with the second wireless communication network cell, where communication for the bearer is established between the wireless device and the second wireless communication network cell when the wireless device begins the handover process, the communication for the bearer being established using the first QoS profile but corresponding to a second QoS level different from the first QoS level, wherein the first QoS level corresponding to the first QoS profile is implemented in the first wireless communication network cell using a first set of QoS parameters and the second QoS level different from the first QoS level is implemented in the second wireless communication network cell using a second set of QoS parameters associated with the first QoS profile;
  determine, after the handover process with the second wireless communication network cell is successful, whether the wireless device is likely to return to the first QoS region served by the first wireless communication network cell;
  determine whether the wireless device is likely to return to the first QoS region comprises:
   starting a timer; and
   determining that a handover of the wireless device back to the first wireless communication network cell or another wireless communication network cell that serves the first QoS region has not occurred when the timer expires;
  when it is determined that the wireless device is not likely to return the first QoS region, assigning a second QoS profile to the bearer; and
  when it is determined that the wireless device is likely to return to the first QoS region, maintaining the first QoS profile.

* * * * *